United States Patent [19]
Watanabe et al.

[11] Patent Number: 5,249,638
[45] Date of Patent: Oct. 5, 1993

[54] MOTOR ASSISTED STEERING APPARATUS FOR VEHICLE

[75] Inventors: Tsukasa Watanabe, Toyota; Fumio Kojima, Nagoya; Mizuho Sugiyama, Toyota, all of Japan

[73] Assignees: Aisin Seiki Kabushiki Kaisha, Kariya; Toyota Jidosha Kabushiki Kaisha, Toyota, both of Japan

[21] Appl. No.: 940,328

[22] Filed: Sep. 3, 1992

[30] Foreign Application Priority Data

Sep. 11, 1991 [JP] Japan ................................ 3-230682

[51] Int. Cl.$^5$ .............................................. B62D 5/30
[52] U.S. Cl. ................................... 180/79.1; 180/133; 180/143; 280/91
[58] Field of Search ...................... 180/79.1, 133, 140, 180/141, 142, 143; 280/91

[56] References Cited
FOREIGN PATENT DOCUMENTS

| | | |
|---|---|---|
| 61-89171 | 5/1986 | Japan . |
| 61-202977 | 9/1986 | Japan . |
| 8706900 | 11/1987 | PCT Int'l Appl. ................. 180/133 |

*Primary Examiner*—Mitchell J. Hill
*Attorney, Agent, or Firm*—Burns, Doane, Swecker & Mathis

[57] ABSTRACT

Rear wheels are returned to central orientations when a rear wheel steering mechanism of 4WS system fails to operate. Required drive power is minimized and the apparatus is reduced in size. A main motor M1 is coupled to a steering shaft 1 through a drive transmitting mechanism 1a, 5a, 5b and 6a, and an auxiliary electric motor M2 is coupled to a drive shaft 6 through a gear mechanism 9, 12, 8a, 7 which includes a solenoid operated clutch CL. The motor M2 is normally disengaged from the drive shaft, but upon detecting the occurrence of a failure, the clutch is activated and the motor M2 is set in operation for returning the steered position of the rear wheels to the center.

7 Claims, 4 Drawing Sheets

MOTOR ASSISTED STEERING APPARATUS FOR VEHICLE

BACKGROUND OF THE INVENTION

The invention relates to a motor assisted steering apparatus which may be used in a four wheel steering (4WS) apparatus of an automobile, for example, and in particular, to a remedy in the event of a failure thereof.

Various arrangements for a four wheel steering apparatus for automobiles have been proposed and are in practical use to improve the running stability over the steering of the front wheels along and to reduce the minimum turning radius, by auxiliary turning the rear wheels simultaneously with the front wheels during a steering operation. In the four wheel steering apparatus of the kind described, a rear wheel steering drive mechanism which changes the orientation of the rear wheels may be mechanically, hydraulically or electrically driven. Of these, the electrically driven type is advantageous in saving a fuel cost.

A typical prior art is disclosed in Japanese Laid-Open Patent Application No. 89,171/1986, for example. However, when a rear wheel steering drive mechanism which is electrically driven is used, in the even a failure occurs in an electric motor and cannot be driven during the time when the rear wheels are being steered, the rear wheels will be fixed as steered. In such a situation, it is very difficult to drive an automobile inasmuch as the automobile must run continually while it is steered laterally to either side, which prevents a normal driving mode.

To accommodate for such inconvenience, a centering spring may be provided for automatically returning the orientation of the rear wheels to the center in the event of the failure of the electric motor, as disclosed in Japanese Laid-Open Patent Application No 202,977/1986. The provision of a steering wheel which allows the rear wheels to be returned to the central or neutral orientation by a manual operation is also proposed.

Safety is assured by the provision of a centering spring as disclosed in Japanese Laid-Open Patent Application No. 202,977/1986 which automatically returns the rear wheels to the central orientations in the event of a failure of an electric motor or the like. However, it is recognized that the centering spring always urges a steering mechanism with a force which tends to return the rear wheels to the central orientations, and accordingly, a force of an increased magnitude, which is sufficient to cause a flexure of the centering spring, must be used over an arrangement having no such centering spring in order to enable a steering operation even during a normal operation when the rear wheels are to be steered, thus resulting in an increased power loss and requiring an electric motor of a higher rating, while accompanying a degraded response of the rear wheel steering. At the current practice, various mechanical elements are disposed around the rear wheel steering mechanism, which makes it difficult to secure a space for the provision of a steering wheel and for a manual maneuvering thereof.

SUMMARY OF THE INVENTION

It is a task of the invention to enable the orientation of wheels to be returned to central orientations in the event of a failure of a drive source and to eliminate a wasteful dissipation of steering power during a normal operation in a motor assisted steering apparatus for vehicle.

The above task is solved by providing in accordance with the invention a steering shaft which is mounted on a vehicle so as to be freely and rectilinearly movable in the lateral direction and engaged with wheels being steered; a drive shaft; main electric drive means for driving the drive shaft; a drive transmitting mechanism including a worm and a worm wheel which engage each other for transmitting the drive from the main electric drive means to the steering shaft as an axial movement thereof; auxiliary electric drive means for driving the steering shaft; and clutch means disposed between the auxiliary electric drive means and the drive transmitting mechanism for engaging and disengaging them.

In accordance with the invention, the main electric drive means remains coupled to the steering shaft through the drive transmitting mechanism, and the orientation of wheels can be changed by laterally moving the steering shaft in response to a drive from the main electric drive means. The clutch means may be controlled to couple the auxiliary electric drive means to the drive transmitting mechanism. Accordingly, in the event of a failure occurring which causes the main electric drive means to become immovable, the auxiliary electric drive means may be activated to enable a steering operation. Accordingly, if a failure occurs in a four wheel steering system when the rear wheels are being steered, the auxiliary electric drive means may be utilized to steer the rear wheels, thus returning them to the central orientations.

In a preferred embodiment of the invention, detecting means may be provided which detects the location or a movement of the steering shaft to provide an output signal. Electronic control means is provided which responds to the output signal from the detecting means to recognize the occurrence or not of any abnormality. During a normal operation, the control means disengages the auxiliary electric drive means from the drive transmitting mechanism and energizes the main electric drive means in response to a given input signal. In the event an abnormality is detected, the control means couples or engages the auxiliary electric drive means with the drive transmitting mechanism while deenergizing the main electric drive means, thus moving the steering shaft to a given location through the energization of the auxiliary electric drive means.

With this arrangement, the occurrence or not of any abnormality can be recognized by detecting the location or a movement of the steering shaft. In the event an abnormality is detected, the electronic control means automatically switches between the main and the auxiliary electric drive means, and activate a solenoid operated clutch to couple the auxiliary electric drive means to the drive transmitting mechanism, which in turn moves the steering shaft to return the wheels to the central orientations.

In another preferred embodiment of the invention, the worm and the worm wheel may be constructed with a zero reversal efficiency so that while the power can be transmitted from the drive shaft to the steering shaft, the transmission of a power from the steering wheel to the drive shaft is disabled. This prevents any likelihood that forces from the wheels from being directly applied to the auxiliary electric drive means even when reactions from the road surface applies external forces to the wheels being steered. Consequently, a stabilized steering operation is enabled with a small electric motor, for example, which is used as the auxiliary electric drive means. In addition, no additional power is required in order to maintain the steering angle.

Other objects and features of the invention will become apparent from the following description of an embodiment thereof with reference to the drawings.

DETAILED DESCRIPTION OF PREFERRED EMBODIMENT

An embodiment of the invention will be described below with reference to a four wheel steering system of an automobile. Initially describing the general arrangement, in the present embodiment, the front wheels of the automobile are mechanically steered by a manipulation of a steering wheel by a driver while the rear wheels are steered in accordance with the steering angle of the front wheels. The rear wheel steering system is automatically steered by a drive from an electric motor. Two electric motors are provided, one being used for a normal steering of the rear wheels and the other for the steering of the rear wheels in the event of a failure.

Figure 1:
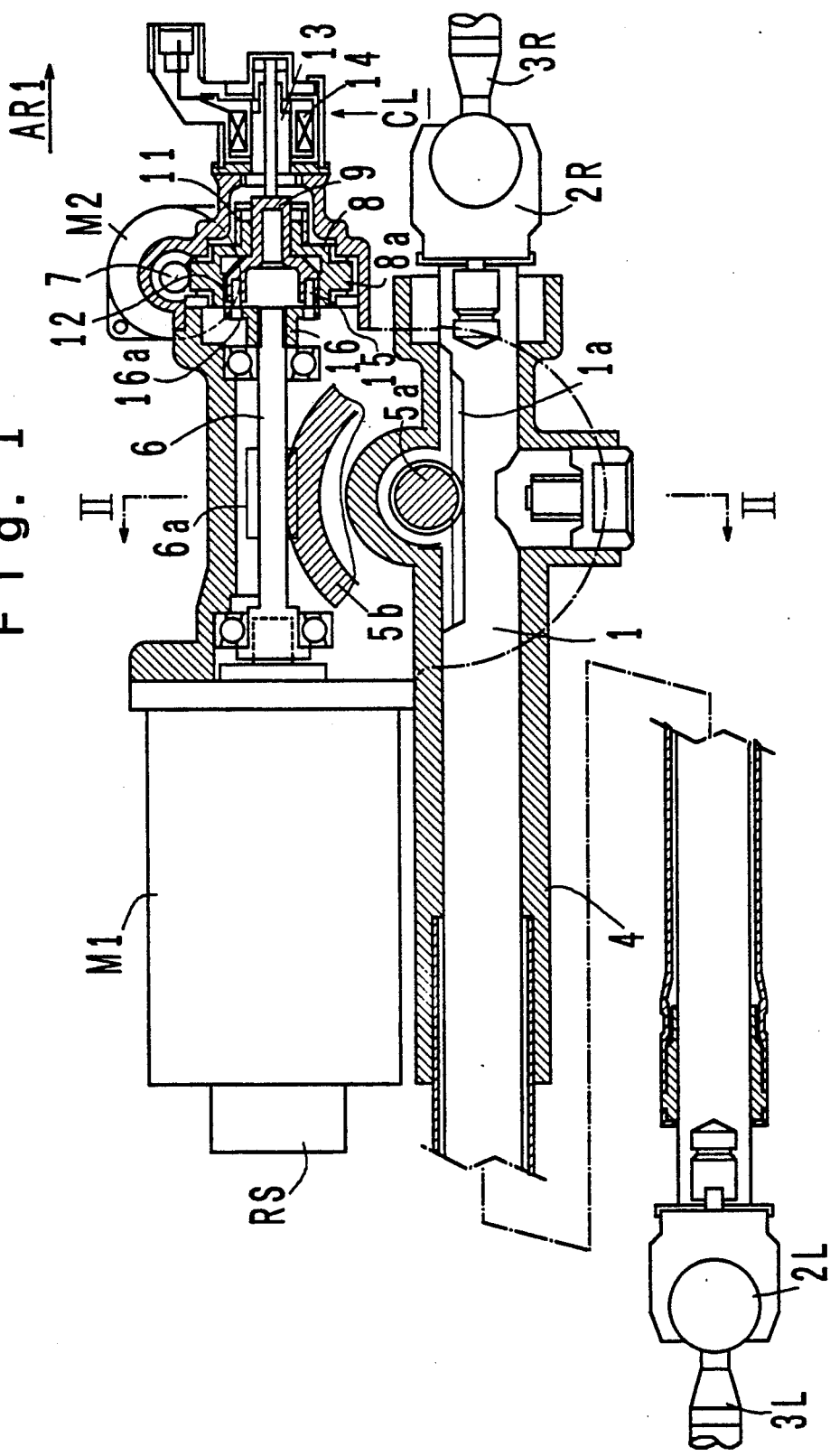
FIG. 1 is a longitudinal section of a main portion of a rear wheel steering mechanism of an embodiment of the invention (taken along the line I—I shown in FIG. 2)
Figure 2:
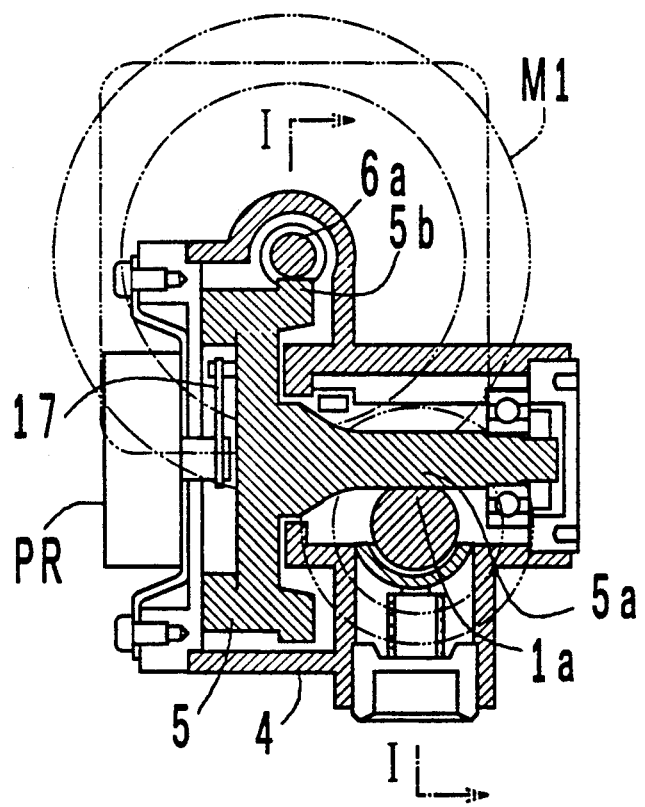
FIG. 2 is a cross section taken along the line II—II shown in FIG. 1.

FIG. 1 shows an essential part of a rear wheel steering mechanism and FIG. 2 shows a cross section taken along the line II—II shown in FIG. 1. FIG. 1 represents a cross section taken along the line I—I shown in FIG. 2. The mechanism will be described with reference to both FIGS. 1 and 2. Initially referring to FIG. 1, a shaft 1 has its left end coupled through a ball joint 2L to a knuckle arm 3L which adjusts the steering angle of the left-hand, rear wheel, and has its right end connected through a ball joint 2R to a knuckle arm 3R which adjusts the steering angle of the right-hand rear wheel. The shaft 1 is supported within a housing which is secured in a car body, and is movable in the axial direction or to the left and the right. As the shaft 1 moves in the axial direction, the respective knuckle arms 3L, 3R are moved, changing the orientation of the left-hand and the right-hand, rear wheel. Connected to the shaft 1 through a drive transmitting mechanism, to be described later, is an electric motor or a main motor M1, which may be driven to achieve an automatic steering of the rear wheels.

The shaft 1 is formed with a rack 1a which is in meshing engagement with a pinion gear 5a. As shown in FIG. 2, the pinion gear 5a is formed on a rotor 5, which is also formed with a worm wheel 5b of a greater diameter, which is in turn in meshing engagement with a worm 6a. Returning to FIG. 1, the worm 6a is formed on a drive shaft 6, to the left end of which is coupled the drive shaft of the electric motor M1. Accordingly, when the motor M1 is set in operation, a drive therefrom causes the worm 6a and hence its meshing worm wheel 5b to rotate, thus causing a rotation of the pinion 5a which is mounted on the same shaft as the worm wheel 5b, thus moving the rack 1a in the axial direction to steer the rear wheels.

The worm gear comprising the worm 6a and the worm wheel 5b is constructed to provide a zero reversal efficiency, namely, a rotating drive from the worm 6a is effective to drive the worm wheel 5b while the rotation of the worm wheel 5b cannot drive the worm 6a. Accordingly, if reactions from a road surface exhibit an increased magnitude, the resulting forces cannot rotate the worm wheel 5b, thus preventing the occurrence of a likelihood that an external force of an increased magnitude may be applied to the motor M1.

Disposed to the right of the drive shaft 6 are a gear mechanism including a solenoid operated clutch CL and an electric motor (or auxiliary motor) M2. A worm 7 is formed on the drive shaft of the motor M2 and is in meshing engagement with a worm wheel 8a. A rotor 8 on which the worm wheel 8a is formed is hollow, receiving a rotor 9 therein. The rotor 8 and the rotor 9 engage each other through a spline 12 formed around the inner wall of the rotor 8 and the outer periphery of the rotor 9, whereby the both rotors are coupled together as far as the direction of rotation is concerned while leaving them free for axial relative movement. However, the rotor 8 which is disposed outside is supported by a housing 4 so as to be immovable in the axial direction.

The rotor 8 includes a portion of a reduced diameter, around which a coiled compression spring 11 is disposed urging the internal rotor 9 to the right or in the direction indicated by an arrow AR1. A core of magnetizable material 13 is connected to the rotor 9, and an electric coil 14 is disposed in surrounding relationship therewith. When the electric coil 14 is energized, the rotor 9 is driven to the left, or in the direction opposite from that indicated by the arrow AR1, against the resilience of the spring 11. The rotor 9 has a plurality of pins 15 mounted on its left end face to project therefrom while a coupling plate 16 secured to the right end of the drive shaft 6 includes a flange, in which openings 16a are formed at locations aligned with the pins 15.

When the coil 14 is not energized, the resilience of the spring 11 causes the rotor 9 displaced to the right, whereby the engagement between the pins 15 and the openings 16a does not occur. However, when the coil 14 is energized, the rotor 9 is driven to the left, whereupon the pins 15 bear against the flange of the coupling plate 16. As the rotor 9 begins to rotate, the pins 15 are forced into the openings 16a. When the pins 15 are fitted in the openings 16a, the rotor 9 and the coupling plate 16 are coupled together in a positive manner, whereby the rotating drive from the rotor 9 can be transmitted to the drive shaft 6 through the coupling plate 16. When the coil 14 ceases to be energized, the resilience of the spring 11 is again effective to displace the rotor 9 to the right, whereby the pins 15 will be disengaged from the openings 16a.

When the motor M2 is set in operation, the worm 7 rotates, and such rotation is transmitted to the rotor 8 through its meshing worm wheel 8a. The rotation of the rotor 8 is transmitted to the internal rotor 9 through the spline 12. When the coil 14 of the clutch CL is energized, the pins 15 and the coupling plate 16 are coupled together, whereby the rotation of the rotor 9 is transmitted to the drive shaft 6 to rotate it, thus driving the rear wheels for steering purpose as when the motor M1 is set in operation.

Since the motor M2 is connected to the drive shaft 6 through the worm 7 and the worm wheel 8a, it is seen that the drive shaft 6 can be driven with a force of a reduced magnitude as compared when utilizing the motor M1. Conversely, as viewed from the side of the motor M1, the motor M2 and the like represent a very large load, but the influence of the motor M2 or the like can be eliminated during the actual steering of the rear wheels inasmuch as the clutch CL may be turned off to disengage the coupling plate 16 from the rotor 9. Since the reduction ratio is high, the speed of operation of the rear wheel steering system comprising the motor M2 will be reduced than that of the motor M1, but in the present embodiment, a high speed of response is unnecessary inasmuch as the operation of the motor M2 is required only when returning the orientation of the rear wheel steering system to the center in the event of a failure.

Referring to FIG. 2, a position sensor or potentiometer PR mounted on the housing 4 includes a rotor, to which an arm 17 is coupled and engages an opening formed in the rotor 5. The position sensor PR is utilized to detect the steering angle of the rear wheel. As shown in FIG. 1, the motor M1 is provided with a rotation detector RS which detects the amount of rotation of the drive shaft thereof.

Figure 3:
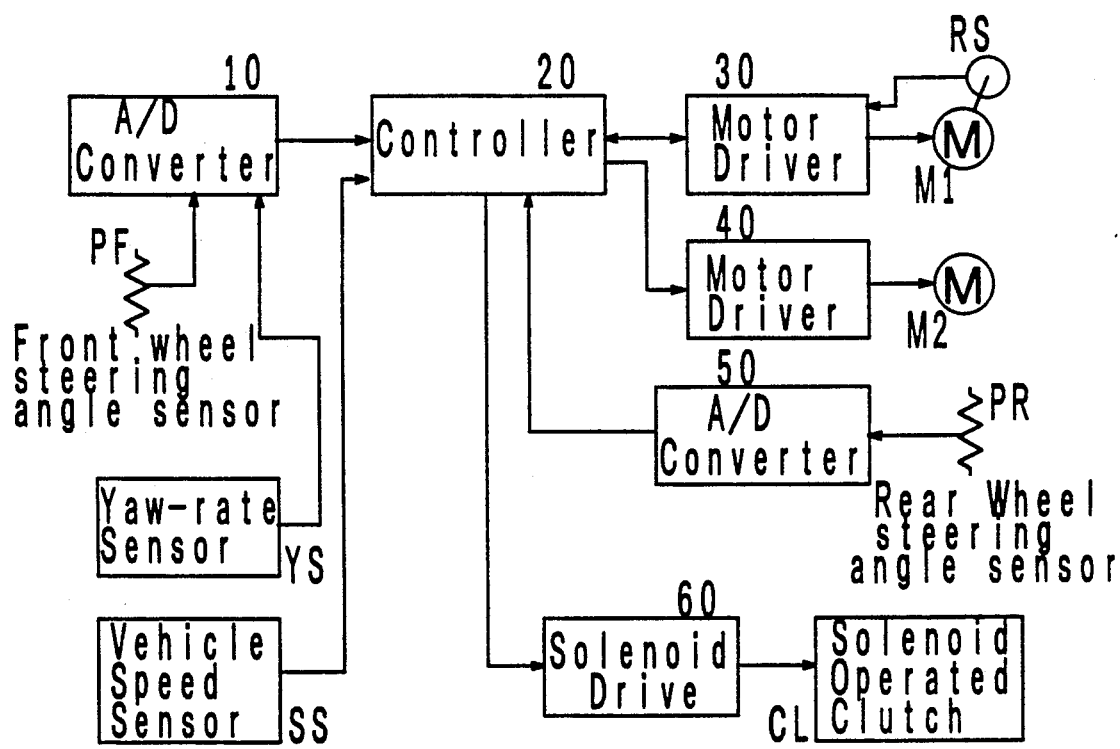
FIG. 3 is a block diagram of an electric circuit of the system of the embodiment.

FIG. 3 shows the arrangement of an electric circuit of a four wheel steering system. Referring to this Figure, information which is used to determine a target steering angle of the rear wheel is obtained in this embodiment from a front wheel steering angle sensor PF, a yaw rate sensor YS and a vehicle speed sensor SS. Electrical signals which are output from the front wheel steering angle sensor PF and the yaw rate sensor YS are applied to A/D converter 10 and thence applied to a controller or a control unit including a microcomputer 20 while a pulse signal which is output from the vehicle speed sensor SS is directly applied to the controller 20. An electrical signal which is output from the rear wheel steering angle sensor PR is applied to A/D converter 50 and thence to the controller 20. The controller 20 controls the main motor M1 through a motor driver 30 and controls the auxiliary motor M2 through a motor driver 40, and controls the clutch CL through a solenoid driver 60.

Figure 4:
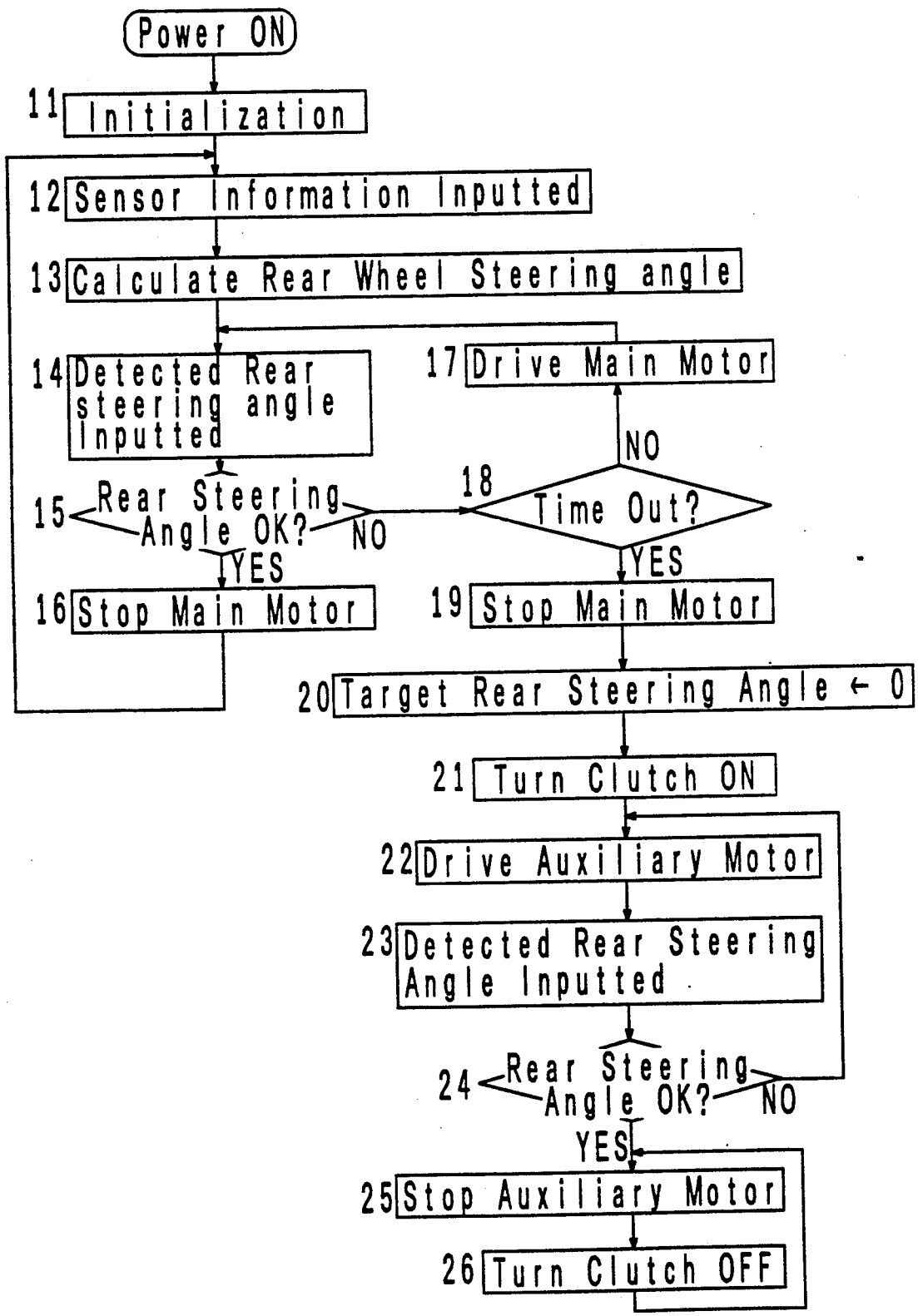
FIG. 4 is a flow chart illustrating the operation of a controller 20 shown in FIG. 3.

An operation of the controller 20 is schematically illustrated by a flow diagram shown in FIG. 4. When the power is turned on, an initialization takes place at a step 11. This ceases the operation of the motors M1 and M2 and deenergizes the clutch CL. At step 12, information including the current front wheel steering angle, yaw rate and vehicle speed are detected on the basis of electrical signals which are output from the front wheel steering angle sensor PF, the yaw rate sensor YS and the vehicle speed sensor SS. At step 13, information detected at step 12 is utilized to calculate a corresponding target steering angle for the rear wheel according to a formula which is determined on the basis of a given control logic. At step 14, the current actual steering angle of the rear wheel is detected on the basis of the electrical signal which is output from the rear wheel steering angle sensor PR. At step 15, the actual steering angle of the rear wheel which is detected at step 14 is compared against the target steering angle obtained at step 13 to see if they match. If mismatch is found, the program proceeds through step 18 to step 17 where the main motor M1 is driven in a direction to bring the actual steering angle closer to the target steering angle of the rear wheel. As far as the actual steering angle of the rear wheel does not coincide with the target steering angle, the processing operations at steps 14, 15, 18 and 17 are repeated. When the actual steering angle matches the target steering angle of the rear wheel, the operation of the main motor M1 is stopped at step 16, and then the program returns to step 12, whereupon the described operation is repeated.

In the event a failure such as a wire breakage within the motor or a poor contact of the wiring occurs in the drive system associated with the main motor M1, the main motor M1 fails to operate. Accordingly, if step 17 tries to drive the main motor, there occurs no change in the actual steering angle, and the time-out which is preset at the step 18 will occur. In response to such a failure, the operation of the main motor M1 is stopped at step 19, and the target steering angle of the rear wheel is preset at 0 (center) at step 20, the clutch CL is turned on at step 21, and then the auxiliary motor M2 is driven in a direction to bring the actual steering angle of the rear wheel closer to the target steering angle at step 22. The actual steering angle of the rear wheel is inputted at step 23, and is compared against the target steering angle at step 24. Until the actual steering angle agrees with the target steering angle of the rear wheel or until the steered orientation of the rear wheel steering system is returned to the center, the operations indicated at steps 22, 23 and 24 are repeated. When the steered orientation of the rear wheel steering system is returned to the center, the program proceeds from step 24 to step 25 where the operation of the auxiliary motor M2 is stopped and the clutch CL is turned off or disengaged at step 26.

As described above, in accordance with the invention, the main electric drive means (M1) is coupled to the steering shaft (1) through the drive transmitting mechanism (1a, 5a, 5b, 6a), and hence the steering shaft can be driven to the left or to the right, thus changing the orientation of the wheels. The solenoid operated clutch means (CL) may be controlled to couple the auxiliary electric drive means (M2) to the drive transmitting mechanism, so that in the event a failure occurs in the main electric drive means, the auxiliary electric drive means may be driven to move the steering shaft, thus returning the wheels to the central orientations.

It will be seen that there is no need for the provision of a centering spring or the like in order to return the steered orientation to the center in the event of a failure, and accordingly, the rear wheels can be steered with a required minimum magnitude of force, with consequence that the electric drive means may be reduced in size and its steering response can be improved. Since the clutch means is interposed between the drive transmitting mechanism and the auxiliary electric drive means, a reduction gearing may be coupled to the auxiliary electric drive means as shown in the embodiment, which allows the auxiliary drive means to be reduced in size as compared with the main electric drive means.

In addition, since the worm gear mechanism is used to provide an interconnection between the respective drive means and the steering mechanism, any reaction from the wheels cannot be directly applied to the electric drive means, which enable a four wheel steering which is stabilized against disturbances caused by the road surface while dispensing with additional power during the steering operation.

What is claimed is:

1. A motor assisted steering apparatus for vehicle comprising
a steering shaft supported on a vehicle so as to be freely and rectilinearly movable in a lateral direction and engaged with wheels being steered;
a drive shaft;
main electric drive means for driving the drive shaft;
drive transmitting means interposed between the drive shaft and the steering shaft and including a worm and a worm wheel which are engaged with each other for transmitting a drive from the main electric drive means to the steering shaft as an axial movement thereof;
auxiliary electric drive means for driving the steering shaft;
and clutch means interposed between the auxiliary electric drive means and the drive transmitting mechanism for achieving an engagement and disengagement between said auxiliary electric drive means and said drive transmitting mechanism.

2. A motor assisted steering apparatus for vehicle according to claim 1, further including detecting means for detecting the location or a movement of the steering shaft to provide an output signal, and electronic control means responsive to an output signal from the detecting means to recognize the occurrence or not of any abnormality, the control means being operative to disengage the auxiliary electric drive means from the drive transmitting mechanism during a normal operation and to energize the main electric drive means in accordance with a given input signal, the control means being operative upon detecting the occurrence of an abnormality to engage the auxiliary electric drive means with the drive transmitting mechanism and to energize the auxiliary electric drive means, while deenergizing the main electric drive means, to move the steering shaft to a given location.

3. A motor assisted steering apparatus for vehicle according to claim 1 in which the combination of the worm and the worm wheel provides a zero reversal efficiency, whereby the transmission of a power from the drive shaft to the steering shaft is enabled while the transmission of a power from the steering shaft to the drive shaft is disabled.

4. A motor assisted steering apparatus for vehicle according to claim 1 in which the worm is formed on the drive shaft while the worm wheel is formed on the steering shaft.

5. A motor assisted steering apparatus for vehicle according to claim 2 in which the wheels steered by the steering shaft represent the rear wheels of a vehicle, and further including means for determining at least one of a front wheel steering angle, a yaw rate of a vehicle and a vehicle speed, the control means being responsive to the quantity determined by the determining means to obtain a target steering angle of the rear wheel, the main electric drive means being energized in accordance with the target steering angle.

6. A motor assisted steering apparatus for vehicle according to claim 5 in which the electronic control means recognizes the occurrence of an abnormality if the actual steering angle detected by the detecting means fails to match the target steering angle within a given period of time.

7. A motor assisted steering apparatus for vehicle according to claim 1 in which the auxiliary electric drive means includes a reduction gearing.

* * * * *